UNITED STATES PATENT OFFICE.

JOHN GRAYSON, OF ROCHDALE, ENGLAND.

MANUFACTURE OF SULPHUR DIOXIDE.

1,402,062.   Specification of Letters Patent.   Patented Jan. 3, 1922.

No Drawing.   Application filed May 29, 1920.   Serial No. 385,363.

*To all whom it may concern:*

Be it known that I, JOHN GRAYSON, a subject of King George V of Great Britain, residing at Rochdale, in the county of Lancaster, England, have invented a new and useful Improvement Relating to the Manufacture of Sulphur Dioxide, (for which I have filed application in England Oct. 31, 1918,) of which the following is a specification.

This invention relates to the manufacture of sulphur dioxide and has for its chief object to produce same without forming oxides of carbon.

According to this invention sulphur dioxide is produced by the action of sulphuric acid on pitch obtained in the distillation of coal tar or of producer gas tar.

For this purpose a quantity of sulphuric acid over 70% strength is introduced into a suitable retort, 5 to 10% in weight of coarsely broken pitch is then added and the contents of the retort are heated until the pitch either dissolves or forms a fine suspension in the acid under which condition sulphur dioxide is given off. The action is then continued at a temperature of from 170 to 240 degrees centigrade until the residue in the retort is only just sufficiently liquid to be run out.

The process above described is suitable for decomposition of waste sulphuric acids such as are obtained from the washing of naphtha fractions and from many organic preparations which at present are rejected as valueless on account of the impurities they contain.

It has previously been proposed to produce sulphur dioxide from the action of sulphuric acid on charcoal, but in this process oxides of carbon are formed, whereas in the present process no oxides of carbon are formed, the pitch remaining behind in the retort after the acid is decomposed. It has been proposed to distil at 125–250° C. the dark coloured impure sulphuric acid obtained as a by-product in refining petroleum, paraffin and the like whereby sulphur dioxide is liberated and a coke like residue remains and it is also known to obtain a solidified tar or pitch by heating tar with sulphuric acid in which operation sulphur dioxide is evolved.

Having thus described my invention, What I claim as new and desire to secure by Letters Patent is:—

1. A process of forming sulphur dioxide which consists in treating pitch with sulphuric acid.

2. A process of forming sulphur dioxide which consists in heating a mixture of pitch and sulphuric acid.

3. A process of forming sulphur dioxide which consists in mixing coarsely broken pitch with sulphuric acid and subjecting the mixture to a heat of from 170° to 240° centigrade.

In testimony whereof I affix my signature in the presence of two witnesses.

JOHN GRAYSON.

Witnesses:
 FRANK LEURIN,
 THOMAS CLEGG.